US008713200B2

(12) United States Patent
Hsiao et al.

(10) Patent No.: US 8,713,200 B2
(45) Date of Patent: Apr. 29, 2014

(54) SYSTEM AND METHOD FOR BROADCASTING RICH MEDIA TO DEVICES OVER MULTIPLE CARRIERS

(75) Inventors: Ipai Terry Hsiao, McLean, VA (US); Kirk Tsai, Potomac, MD (US)

(73) Assignee: Buc Mobile, Inc., Vienna, VA (US)

( * ) Notice: Subject to any disclaimer, the term of this patent is extended or adjusted under 35 U.S.C. 154(b) by 919 days.

(21) Appl. No.: 12/751,267

(22) Filed: Mar. 31, 2010

(65) Prior Publication Data

US 2010/0250780 A1 Sep. 30, 2010

Related U.S. Application Data

(60) Provisional application No. 61/165,199, filed on Mar. 31, 2009.

(51) Int. Cl.
*G06F 15/16* (2006.01)

(52) U.S. Cl.
USPC ............ 709/246; 709/202; 709/203; 709/245

(58) Field of Classification Search
USPC ................. 709/202–203, 217–219, 227–228, 709/245–246
See application file for complete search history.

(56) References Cited

U.S. PATENT DOCUMENTS

| | | | | |
|---|---|---|---|---|
| 6,195,696 B1 * | 2/2001 | Baber et al. | ................... | 709/223 |
| 6,564,259 B1 * | 5/2003 | Baber et al. | ................... | 709/223 |
| 6,564,260 B1 * | 5/2003 | Baber et al. | ................... | 709/223 |
| 6,684,257 B1 * | 1/2004 | Camut et al. | .................. | 709/246 |
| 7,460,830 B2 * | 12/2008 | Moore, III | ................... | 455/13.2 |
| 7,784,065 B2 * | 8/2010 | Polivy et al. | .................. | 719/328 |
| 7,823,210 B2 * | 10/2010 | Bessonov et al. | ............... | 726/27 |
| 7,873,705 B2 * | 1/2011 | Kalish | ........................ | 709/219 |
| 7,991,353 B2 * | 8/2011 | Moore, III | ................... | 455/13.2 |
| 8,103,707 B2 * | 1/2012 | Moon et al. | ................... | 709/219 |
| 8,175,582 B2 * | 5/2012 | Benco et al. | .................. | 709/228 |
| 2008/0056498 A1 * | 3/2008 | Verma | ......................... | 380/278 |
| 2011/0113122 A1 * | 5/2011 | Drope | .......................... | 709/219 |

* cited by examiner

*Primary Examiner* — Bharat N Barot
(74) *Attorney, Agent, or Firm* — Toering Patents PLLC

(57) ABSTRACT

The invention pertains to systems and methods for providing content to a device including receiving an identifier for each of at least one device that should receive the content; determining a device type for each of the at least one device that should receive the content; determining device parameters for each of the at least one device that should receive the content based on the determined device type; tailoring the content for each of the at least one device that should receive the content based on the determined device parameters; and providing the tailored content to each of the at least one device that should receive the content.

15 Claims, 4 Drawing Sheets

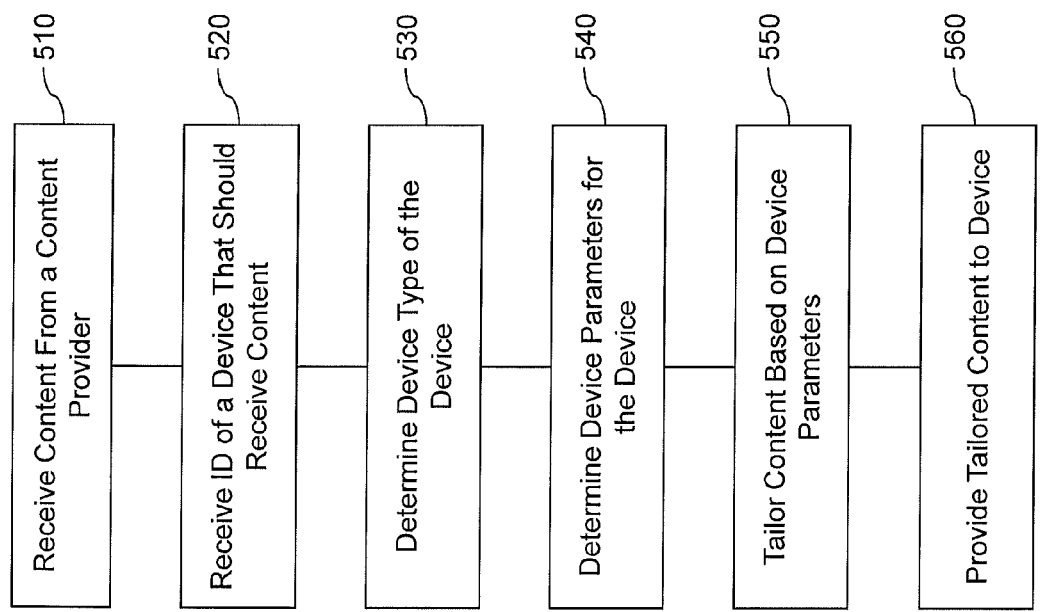

SYSTEM AND METHOD FOR BROADCASTING RICH MEDIA TO DEVICES OVER MULTIPLE CARRIERS

CROSS-REFERENCE TO RELATED APPLICATIONS

This Application claims priority to U.S. Provisional Application Ser. No. 61/165,199, filed on Mar. 31, 2009, which is incorporated herein by reference in its entirety.

FIELD OF THE INVENTION

The invention relates to broadcasting content to devices operating on different carriers, and more particularly, to broadcasting rich media tailored for each of the devices operating on different carriers using a Multimedia Messaging Service ("MMS").

BACKGROUND OF THE INVENTION

A wide variety of handheld wireless devices are available. Each of these devices includes a variety of features and capabilities that often differ widely from other devices. For example, 1) devices may have different displays with different sizes, different aspect ratios, etc.; 2) devices may have different Digital Right Management ("DRM") settings, Synchronized Multimedia Integration Language ("SMIL") settings, different memory sizes, etc.; and/or 3) devices may have different media rendering capabilities.

In addition to the devices being different, the devices themselves may operate on different carriers that provide different capabilities and protocols as far as receiving various forms of rich media.

Content providers desire to provide, and users desire to receive via their devices, a wide variety of content. This content may include a variety of rich media, including photo slideshow media, audio media, video media, animation media, flash media, and other rich media. Each of these different types of content may require different technologies for transmission to (via push or pull) and rendering by various devices.

Often, users subscribe to receive content from content providers. In response, content providers desire to broadcast their content to each of their subscribers (i.e., users that subscribe to receive the content). However, content providers are ill equipped to keep pace with technological changes in the devices, the carriers on which the devices operate, and/or the content being broadcasted to the devices.

What is needed is an improved mechanism for providing a variety of content to different devices operating on different carriers.

BRIEF DESCRIPTION OF THE DRAWINGS

FIG. 5 illustrates a process for broadcasting content to devices in the content broadcast system according to various implementations of the invention.

SUMMARY OF THE INVENTION

Various implementations of the invention assist content providers with providing different types of content to different devices via different carriers. In some implementations of the invention, a method for providing content to a device comprises receiving an identifier for each of at least one device that should receive the content; determining a device type for each of the at least one device that should receive the content; determining device parameters for each of the at least one device that should receive the content based on the determined device type; tailoring the content for each of the at least one device that should receive the content based on the determined device parameters; and providing the tailored content to each of the at least one device that should receive the content. These and other implementations of the invention are described in more detail below.

DETAILED DESCRIPTION OF THE INVENTION

Figure 1:
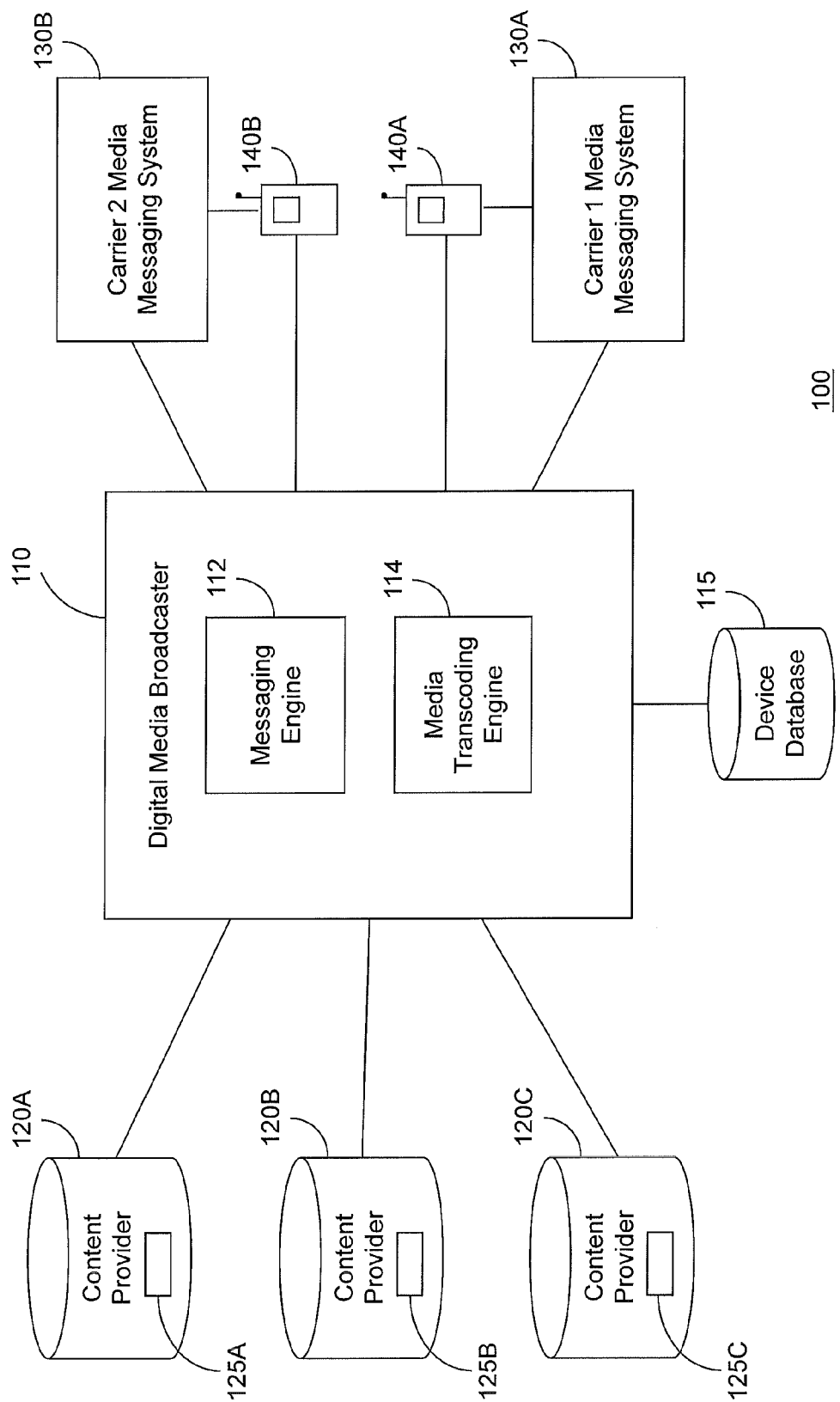
FIG. 1 illustrates a content broadcast system according to various implementations of the invention.

FIG. 1 illustrates a content broadcast system 100 according to various implementations of the invention. Content broadcast system 100 includes a plurality of different content providers 120 (illustrated in FIG. 1 as a content provider 120A, a content provider 120B, and a content provider 120C); a digital media broadcaster 110; a plurality of carriers 130 (illustrated as a carrier 130A and a carrier 130B); and a plurality of devices 140 (illustrated as a device 140A and a device 140B).

Each content provider 120 includes at least one content 125 that it desires to provide (illustrated in FIG. 1 as a content 125A provided by content provider 120A, a content 125B provided by content provider 120B, and a content 125C provided by content provider 120C). Content 125 may include a variety of rich media content including a photo media content, an audio media content, a video media content, an animation media content, a flash media content, and other rich media content.

Each carrier 130 provides various services to a plurality of devices 140 operating on its carrier network using various types of carrier network technologies/protocols as would be apparent. For example, carrier 130A may employ a Global System for Mobile communications ("GSM") standard for its carrier network, whereas carrier 130B may employ a code division multiple access communications ("CDMA") standard for its carrier network. Carriers 130 may employ other types of carrier network technologies/protocols. Various implementations of the invention may include or be used with carriers employing different carrier networks.

Figure 2:
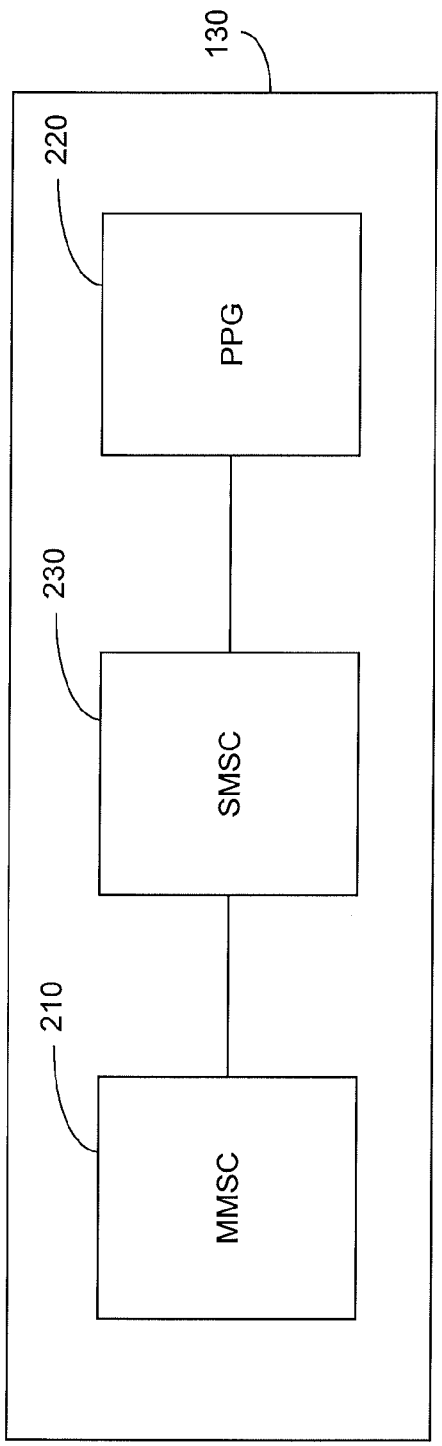
FIG. 2 illustrates various components of a carrier that may be used the content broadcast system according to various implementations of the invention.

FIG. 2 illustrates a carrier 130 that may be used with various implementations of the invention. Carrier 130 may include a multimedia messaging service center ("MMSC") 210, a short message service center ("SMSC") 230 and a push proxy gateway ("PPG") 220. Together, MMSC 210, SMSC 230, and PPG 220 provide various messaging capabilities to devices 140 operating on a carrier network of carrier 130.

Devices 140 operating on a particular carrier 130 vary widely as would be appreciated. Devices 140 may include different displays with different sizes, different aspect ratios, and other display differences. Devices 140 may include different processors with different DRM settings, different functionality, and other processor differences. Device 140 may include support for rendering SMIL enabled MMS messages. Devices 140 may include different media rendering capabilities for rendering different rich media content on the display of device 140. In addition, some devices 140 may only operate with a particular carrier 130 (or carrier network), while some devices 140 may operate with different carriers 130 (or carrier networks).

Figure 3:
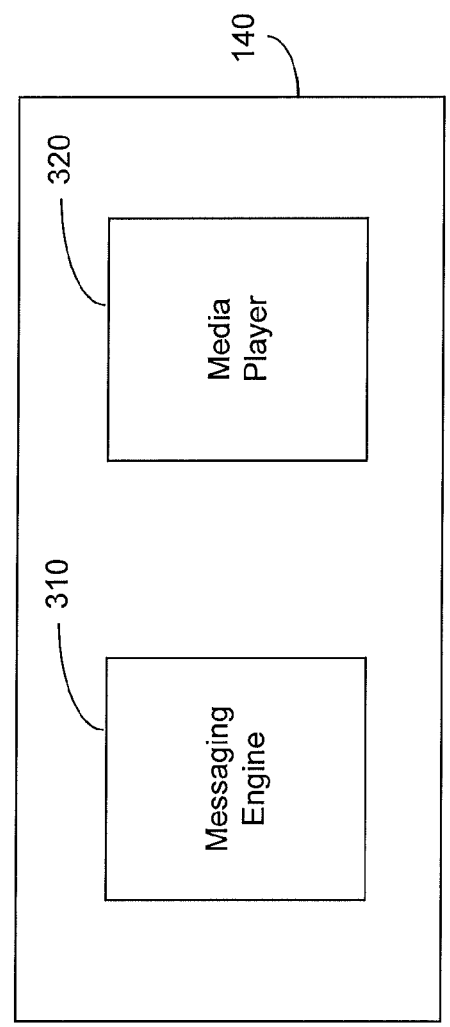
FIG. 3 illustrates various components of a device that may be used in the content broadcast system according to various implementations of the invention.

FIG. 3 illustrates a device 140 that may be used with various implementations of the invention. Device 140 may include a messaging engine 310 and a media player 320. Messaging engine 310 operates to send and receive various messages between carrier 130 and device 140. Media player 320 renders messages 125 on a display or speaker of device 140. While illustrated in FIG. 3 as being independent from one another, media player 320 may be embedded in messaging engine 310 as would be apparent.

As described above, content providers 120 desire to provide different types of content 125 to their subscribers via different devices 140 over different carriers 130. In some implementations of the invention, digital media broadcaster 110 receives content 125 from content providers 120 and broadcasts or otherwise distributes content 125 to the different devices 140 over different carriers 130. Digital media broadcaster 110 may include a messaging engine 112 and a media transcoding engine 114. Messaging engine 112 operates to provide various messaging capabilities of digital media broadcaster 110 as are discussed in further detail below. Transcoding engine 114 operates to provide various transcoding capabilities of digital media broadcaster 110 as are discussed in further detail below.

In various implementations of the invention, digital media broadcaster 110 may also interface with a device database 115. Device database 115 may include specifications for a variety of different devices 140. In some implementations of the invention, these specifications may be used to tailor or optimize messaging between digital media broadcaster 110 and a particular device 140. In some implementations of the invention, these specifications may be used to tailor or optimize content 125 provided to device 140 for rendering as will be discussed in further detail below. In some implementations of the invention, device database 115 is a proprietary database associated with digital media broadcaster 110.

In some implementations of the invention, digital media broadcaster 110 receives content 125 from content providers 120 and broadcasts or otherwise distributes the received content 125 to the different devices 140 over different carriers 130. In some implementations of the invention, digital media broadcaster tailors content 125 for carrier 130 for distribution to device 140. In some implementations of the invention, digital media broadcaster tailors content 125 for device 140. In some implementations of the invention, digital media broadcaster optimizes content 125 for carrier 130 for distribution to device 140. In some implementations of the invention, digital media broadcaster optimizes content 125 for device 140. In some implementations of the invention, digital media broadcaster optimizes content 125 for a display of device 140. In some implementations of the invention, digital media broadcaster optimizes content 125 for media player 320 of device 140.

In order for digital media broadcaster 110 to provide tailored or optimized content 125 to different devices 140 via different carriers 130, digital media broadcaster 110 may need to determine a particular carrier 130, from among a plurality of carriers 130, via which a particular device 140 receives service. Each particular device 140 includes or is otherwise associated with an identifier, such as a phone number, that may be used to determine the identity of the particular carrier 130 as would be apparent. Once the identity of the particular carrier 130 is determined, digital media broadcaster 110 may determine a particular carrier network employed by the particular carrier 130 as would be apparent.

After determining the particular carrier 130 and the particular carrier network/protocol, digital media broadcaster 110 may need to determine a device type of the particular device 140. Determining a device type of the particular device 140 is dependant upon the particular carrier 130 and/or the particular carrier network/protocol being employed.

On some carriers 130 that do not employ the GSM standard, digital media broadcaster 110 may utilize a device discovery process associated with the particular carrier 130. Some of these device discovery processes are referred to as "out-of-band" discovery processes and are generally well known. During the device discovery process, digital media broadcaster 110 may send a "device detection message" to the particular carrier 130 to identify the device type of the particular device 140. Other "out-of-band" discovery processes may be used by carriers 130 to determine the device type of the particular device 140 as would be appreciated.

Carriers 130 that employ the GSM standard typically do not provide a mechanism for identifying a device type of devices operating on their carrier network. On such carriers 130, digital media broadcaster 110 may utilize the MMS and/or the SMS services provided by the particular carrier 130 to communicate with the particular device 140 to determine its device type. Such MMS and SMS services are generally well known. Using these services, digital media broadcaster 110 delivers a DMB message (i.e., a message unique to digital media broadcaster 110) to SMSC 230 and/or PPG 220 of the particular carrier 130. In some implementations of the invention, the DMB message is a binary SMS message that SMSC 230 and/or PPG 220 of the particular carrier 130 delivers to the particular device 140 through an SMS channel. In some implementations of the invention, the DMB message is addressed to an MMS client of messaging engine 310 of the particular device 140. In these implementations, the particular device 140 recognizes that the DMB message is not an SMS message (i.e., a "text message") even though delivered on the SMS channel because the DMB message is addressed to the MMS client on the particular device 140. In some implementations of the invention, the DMB message mimics an MMS notification in form of an SMS message.

In some implementations of the invention, the DMB message includes a link (e.g., a uniform resource locator "URL") back to digital media broadcaster 110 rather than to carrier 130 as with conventional MMS and/or SMS messages. In some implementations of the invention, the DMB message mimics an MMS notification with an embedded link back to digital media broadcaster 110 (e.g., a "DMB URL") rather than to carrier 130 as with conventional MMS and/or SMS messages.

When the MMS client of messaging engine 310 on the particular device 140 opens the DMB message, the MMS client of messaging engine 310 uses the link back to the digital media broadcaster 110 to "fetch" content located at the link. While the fetch process itself is conventional, according to various implementations of the invention, the link directs the MMS client of messaging engine 310 to digital media broadcaster 110 rather than to carrier 130. More particularly, the MMS client of messaging engine 310 employs conventional HTTP protocols to fetch the content located at the link. As part of this protocol and as is generally well known, the MMS client of messaging engine 310 sends information identifying itself in a form of either: 1) a user agent of the particular device 140 or 2) a User Agent Profile ("UAProf") of the particular device 140. The user agent includes the device type of the particular device 130 or allows the device type to be determined. The UAProf includes a URL (to either a manufacturer or a carrier) from which specifications for the particular device may be retrieved. In this manner, digital media broadcaster 110 receives either the device type of the particular device 140 or information (i.e., specifications or a reference thereto) from which the device type may be determined.

Once the device type of the particular device 140 is determined, digital media broadcaster 110 may determine various device parameters associated with the particular device 140. These device parameters may include communication parameters, display parameters, formatting parameters, transcoding parameters, media player parameters, and/or other device parameters. These device parameters may be used by digital media broadcaster 110 to tailor and/or optimize delivery to and/or rendering by the particular device 140 of content 125 from content provider 120 as would be apparent.

In some implementations of the invention, digital media broadcaster 110 may determine the device parameters by accessing device database 115. More particularly, digital media broadcaster 110 may query device database 115 with the device type to retrieve the device parameters.

In some implementations of the invention, when device database 115 does not include the device parameters for the particular device 140, other device databases (not otherwise illustrated) may be queried. In some implementations of the invention, such other device databases may include a wireless uniform resource file ("WURFL") such as is available at www.wurfl.sourceforge.net. The WURFL is an XML configuration file that includes the device parameters of various devices 140. More particularly, digital media broadcaster 110 may query such other device databases with the device type to retrieve the device parameters. In some implementations of the invention, when device parameters are retrieved from other device databases, digital media broadcaster 110 may store the retrieved device parameters in device database 115 for subsequent use. In some implementations of the invention, digital media broadcaster 110 may periodically download the WURFL for local use as would be apparent.

In some implementations of the invention, when device parameters for the particular device 140 are not available from device database 115 or such other device databases, the user agent profile may be used. More particularly, digital media broadcaster 110 may utilize specifications for the particular device 140 retrieved from either a manufacturer of the particular device 140 or a carrier associated with the particular device using the user agent profile. In some implementations of the invention, digital media broadcaster 110 may parse the specifications of the particular device 140 to determine various device parameters.

In some implementations of the invention, when device parameters for the particular device 140 are not available from device database 115, such other device databases or from available specifications, the device type is flagged for manual resolution.

Once the device parameters of the particular device 140 are determined, digital media broadcaster 110 may tailor and/or optimize content 125 to be provided to and/or rendered by the particular device 140 according to various implementations of the invention. In some implementations, digital media broadcaster 110 may employ various transcoders to tailor and/or optimize content 125 for the particular device 140. Such transcoders are generally well known.

Once content 125 is tailored and/or optimized for the particular device 140, digital media broadcaster 110 provides the tailored and/or optimized content 125 to the particular device 140 in fulfillment of the HTTP fetch from the particular device 140. In some implementations of the invention, the tailored and/or optimized content 125 is stored at digital media broadcaster 110. In some implementations of the invention, the tailored and/or optimized content 125 is delivered to carrier 130 using conventional messaging techniques as would be apparent.

Figure 4:
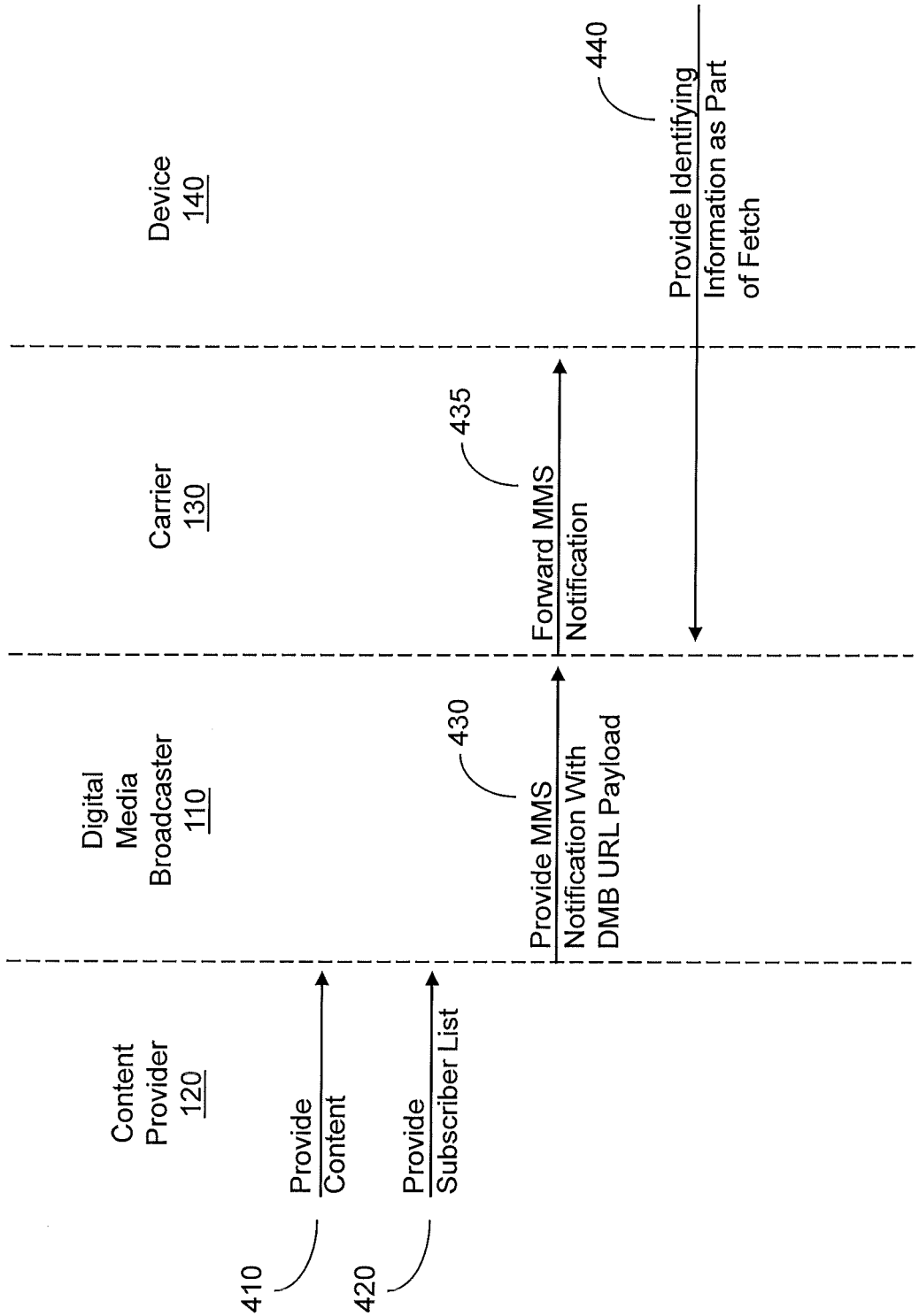
FIG. 4 illustrates a communication flow diagram for various messages that may be used in the content broadcast system according to various implementations of the invention.

Various implementations of the invention are now described in reference to FIG. 4. FIG. 4 illustrates a communication flow diagram according to various implementations of the invention. In a communication 410, content provider 120 provides content 125 to digital media broadcaster 110. In some implementations of the invention, content 125 may be in any format. In some implementations of the invention, content 125 may be in a format associated with content provider 120. In some implementations of the invention, content 125 may be in a standard format. In some implementations of the invention, digital media broadcaster 110 convert the format of content 125 to a format associated with digital media broadcaster 110 in order to simplify various downstream transcoding operations as would be apparent.

In a communication 420, content provider 120 provides a subscriber list to digital media broadcaster 110. In some implementations of the invention the subscriber list includes a plurality of identifiers, each identifier identifying a particular device 140 that should receive content 125. In some implementations of the invention, the subscriber list may be provided to digital media broadcaster 110 before, after, or along with content 125. In some implementations of the invention, digital media broadcaster 110 stores the subscriber list for use with content 125 from content provider 120 until digital media broadcaster 110 receives a new subscriber list. In various implementations of the invention, digital media broadcaster 110 may receive content 125 and corresponding subscriber lists from each of a plurality of different content providers 120. In various implementations of the invention, digital media broadcaster 110 may receive a plurality of content 125, and a corresponding subscriber list for each, from a single content provider 120. In various implementations of the invention, digital media broadcaster 110 may receive content 125 and an identification of a single device 140 from a single content provider 120. In various implementations of the invention, digital media broadcaster 110 may receive content 125 and an identification of a single device 140 from another device 140. In various implementations of the invention, digital media broadcaster 110 may receive content 125 and an identification of a plurality of devices 140 from another device 140. In various implementations of the invention thus described, the identification of a particular device 140 may include a phone number of the particular device 140.

In some implementations of the invention, a subscriber (or user, if not previously subscribed) sends an SMS to a "shortcode" and optional keyword combination to trigger delivery of content 125 from content provider 120. In these implementations, content 125 is broadcast to the single subscriber in response to the SMS.

In some implementations of the invention, content provider 120 may trigger delivery of content 125 to active subscribers of a particular service of content provider 120. In some implementations of the invention, content provider 120 provides digital media broadcaster 110 with a service identifier that identifies the particular service and/or a list of subscribers to the particular service. In some implementations of the invention, digital media broadcaster 110 may uses the service identifier to identify the list of subscribers to the particular service, where the list is stored and/or managed at digital media broadcaster 110.

In some implementations of the invention, content provider 120 provides or otherwise specifies a delivery schedule for content 125 to be broadcast to a list of subscribers. In some implementations of the invention, content provider 120 provides content 125 or otherwise makes content 124 available to digital media broadcaster 110 in advance of each scheduled broadcast.

In a communication 430, digital media broadcaster 110 provides a DMB message to carrier 130 intended for an identified device 140 (i.e., a device 140 identified by content provider 120 in, for example, a subscriber list). In some implementations as discussed above, the DMB message corresponds to a MMS notification with a payload that includes a link to digital media broadcaster 110 (e.g., a DMB URL). In a communication 435, carrier 130 provides the DMB message to the identified device 140. In some implementations of the invention, digital media broadcaster 110 may provide the DMB message directly to the identified device 140.

In a communication 440, the identified device 140, as part of an HTTP fetch of content from digital media broadcaster 110 at the DMB URL, provides information identifying itself to digital media broadcaster 110.

After digital media broadcaster 110 identifies the device type of the identified device 140 and tailors and/or optimizes content 125 for the identified device, digital media broadcaster 110, in response to the HTTP fetch from the identified device 140, provides the tailored and/or optimized content 125 to the identified device 140.

An operation of digital media broadcaster 110 is now described in reference to FIG. 5 and in accordance with various implementations of the invention. In an operation 510, digital media broadcaster 110 receives content 125 from a content provider 120. In various implementations of the invention, content provider 120 may include a content aggregator, a content generator, a content publisher, another device 140, or other content provider. In an operation 520, digital media broadcaster 110 receives an identifier for each of at least one particular device 140 that should receive content 125. In an operation 530, digital media broadcaster 110 determines a device type for the particular device 140. In an optional operation (not otherwise illustrated), digital media broadcaster determines a carrier with which the particular device 140 operates. In various implementations of the invention, digital media broadcaster 110 may determine the device type for the particular device 140 by: 1) querying a carrier 130 on which the particular device 140 operates; 2) querying the particular device 140 directly; or 3) querying the particular device 140 indirectly. In some implementations of the invention, digital media broadcaster 110 may query the particular device 140 indirectly by sending a MMS notification with a DMB URL payload over an SMS channel which prompts the particular device 140 to initiate an HTTP fetch of content located at the DMB URL thereby indirectly providing digital media broadcaster 110 with information pertaining to the device type as discussed in detail above.

In an operation 540, digital media broadcaster 110 determines device parameters for the particular device 140 based on the device type. In various implementations of the invention, digital media broadcaster 110 retrieves the device parameters from: 1) a local device database 115; 2) an external device database; 3) published specifications for the device type; or 4) manual retrieval and determination of the device parameters.

In an operation 550, digital media broadcaster 110 tailors content 125 for the particular device 140 based on the device parameters for the particular device 140. In some implementations of the invention, digital media broadcaster 110 optimizes content 125 for the particular device 140 based on the device parameters for the particular device 140.

In an operation 560, digital media broadcaster 110 provides, or otherwise makes available, the tailored content 125 to the particular device 140. In various implementations of the invention, digital media broadcaster 110 provides the tailored content 125 to the particular device 140 in response to the HTTP fetch initiated by the particular device 140.

In various implementations of the invention, digital media broadcaster 110 may repeat various ones of operations 530-560 for each of a plurality of devices 140 identified by content provider 120.

In various implementations of the invention, digital media broadcaster 110 may repeat various ones of operations 530-560 for each of a plurality of devices 140 identified by content provider 120, where some of the plurality of devices 140 have a first device type and others of the plurality of devices 140 have a second device type.

In various implementations of the invention, digital media broadcaster 110 may repeat various ones of operations 530-560 for each of a plurality of devices 140 identified by content provider 120, where some of the plurality of devices 140 operate with a first carrier 130 and others of the plurality of devices 140 operate with a second carrier 130.

In various implementations of the invention, digital media broadcaster 110 may repeat various ones of operations 510-560 for each of a plurality of different types of content provided by content provider 120.

Various implementations of the invention may be made in hardware, firmware, software-enabled hardware, or any suitable combination thereof. Various implementations of the invention may include software instructions stored on a computer readable medium, which may be read and executed by one or more processors. A computer readable medium may include any tangible mechanism for storing or transmitting information in a form readable by a machine (e.g., a computing device). For example, a computer readable medium may include read only memory, random access memory, magnetic disk storage media, optical storage media, flash memory devices, and other tangible medium. Further, firmware, software, routines, or instructions may be described in the above disclosure in terms of specific exemplary aspects and implementations of the invention, and performing certain actions. However, it will be apparent that such descriptions are merely for convenience and that such actions in fact result from computing devices, processors, controllers, or other devices executing the firmware, software, routines, or instructions.

Various implementations of the invention and/or components thereof may include a general purpose computer programmed with software instructions that when executed on the general purpose computer perform various features and functions of the invention described herein. When such a general purpose computer is programmed with and executes such software instructions, the general purpose computer becomes a particular computer that performs the various features and functions of various implementations of the invention or components thereof.

Aspects and implementations may be described as including a particular feature, structure, or characteristic, but every aspect or implementation may not necessarily include the particular feature, structure, or characteristic. Further, when a particular feature, structure, or characteristic is described in connection with an aspect or implementation, it will be understood that such feature, structure, or characteristic may be included in connection with other aspects or implementations, whether or not explicitly described. Thus, various changes and modifications may be made to the description without departing from the scope or spirit of the invention. As such, the specification and drawings should be regarded as exemplary only.

What is claimed is:

1. A method for broadcasting content to a device comprising:
   in response to a request to broadcast content to a plurality of subscribers, wherein each of the plurality of subscribers is associated with a device to which the content should be broadcast, receiving an identifier for the device associated with each of the plurality of subscribers that should receive the content;
   determining a device type for the device associated with each of the plurality of subscribers that should receive the content based on the corresponding identifier;
   determining device parameters for the device associated with each of the plurality of subscribers that should receive the content based on the determined device type;
   tailoring the content for the device associated with each of the plurality of subscribers that should receive the content based on the determined device parameters; and
   providing the tailored content to the device associated with each of the plurality of subscribers that should receive the content.

2. The method of claim 1, wherein providing the tailored content to the device associated with each of the plurality of subscribers that should receive the content comprises providing the tailored content in response to an HTTP fetch initiated by the device associated with each of the plurality of subscribers that should receive the content.

3. The method of claim 1, determining a device type for the device associated with each of the plurality of subscribers that should receive the content comprises delivering a message for the device associated with each of the plurality of subscribers that should receive the content, wherein the message includes a link from which the content can be retrieved by the device, wherein the link is not directed to a carrier on which the device operates.

4. The method of claim 3, wherein delivering a message for the device associated with each of the plurality of subscribers that should receive the content comprises delivering a binary SMS message to a carrier associated with the device associated with each of the plurality of subscribers that should receive the content, thereby causing the carrier to deliver the binary SMS message through an SMS channel to the associated device.

5. The method of claim 3, wherein delivering a message for the device associated with each of the plurality of subscribers that should receive the content comprises delivering the message to an MMS client of the device associated with each of the plurality of subscribers that should receive the content.

6. The method of claim 1, wherein determining a device type for the device associated with each of the plurality of subscribers that should receive the content comprises querying a carrier with which the device operates.

7. The method of claim 1, wherein determining a device type for each of the at least one device that should receive the content comprises directly querying the device that should receive the content.

8. The method of claim 1, wherein determining a device type for the device associated with each of the plurality of subscribers that should receive the content comprises indirectly querying the device that should receive the content.

9. The method of claim 8, wherein indirectly querying the device associated with each of the plurality of subscribers that should receive the content comprises sending an MMS notification with a payload over an SMS channel, where the payload includes a uniform resource locator not associated with a carrier of the device.

10. The method of claim 1, wherein determining device parameters for the device associated with each of the plurality of subscribers that should receive the content based on the determined device type comprises retrieving the device from a local device database, an external device database, published specifications for the device type, or manual retrieval.

11. The method of claim 1, wherein tailoring the content for the device associated with each of the plurality of subscribers that should receive the content based on the determined device parameters comprises optimizing the content for the device based on the determined device parameters.

12. The method of claim 1, wherein the content provider comprises a content aggregator, a content generator, or a content publisher.

13. The method of claim 1, wherein the content provider comprises another device.

14. The method of claim 1, further comprising determining a carrier with which the device operates.

15. The method of claim 1, wherein the device type includes a make or a model of the device.

* * * * *